(12) United States Patent
Matthews

(10) Patent No.: US 8,251,020 B2
(45) Date of Patent: Aug. 28, 2012

(54) LEASH HAVING A SPEED-LIMITING BRAKING MECHANISM AND SYSTEM AND METHOD FOR USING SAME

(75) Inventor: Andy Matthews, Evanston, IL (US)

(73) Assignee: Unleashed Products, LLC, Evanston, IL (US)

( * ) Notice: Subject to any disclaimer, the term of this patent is extended or adjusted under 35 U.S.C. 154(b) by 100 days.

(21) Appl. No.: 12/661,247

(22) Filed: Mar. 12, 2010

(65) Prior Publication Data

US 2011/0220036 A1    Sep. 15, 2011

(51) Int. Cl.
    *B65H 75/34*    (2006.01)
(52) U.S. Cl. .............. 119/796; 242/396.1; 242/396.5; 182/134; 182/239
(58) Field of Classification Search ........... 242/396.1, 242/396.2, 396.5, 379.1, 381.4, 381.5, 295, 242/383, 396.8; 182/231, 234, 239, 235, 182/240; 119/769, 770, 781, 782, 795, 796, 119/797, 798
See application file for complete search history.

(56) References Cited

U.S. PATENT DOCUMENTS

| | | | |
|---|---|---|---|
| 2,217,323 A | 10/1940 | Sackett | |
| 2,647,703 A | 8/1953 | Hayes | |
| 3,123,052 A | 3/1964 | Marshall | |
| 3,250,253 A | 5/1966 | Galin | |
| 4,907,756 A | 3/1990 | Bourrat | |
| 6,526,918 B1* | 3/2003 | Arnold | 119/796 |
| 6,694,922 B2 | 2/2004 | Walter et al. | |
| 6,695,101 B1 | 2/2004 | Wang | |
| 6,845,736 B1 | 1/2005 | Anderson | |
| 6,904,872 B2* | 6/2005 | Muller | 119/796 |
| 6,966,407 B2* | 11/2005 | Karnes et al. | 182/239 |
| 7,036,459 B1 | 5/2006 | Mugford et al. | |
| 7,040,257 B2 | 5/2006 | Waxman et al. | |
| 7,344,102 B1 | 3/2008 | Royer et al. | |
| 2003/0145803 A1 | 8/2003 | Muller | |
| 2006/0096807 A1* | 5/2006 | Lee | 182/234 |
| 2007/0022975 A1* | 2/2007 | Arnold | 119/796 |
| 2010/0226748 A1* | 9/2010 | Wolner et al. | 414/815 |
| 2011/0073047 A1* | 3/2011 | Simpson et al. | 119/796 |

* cited by examiner

*Primary Examiner* — Kimberly Berona
*Assistant Examiner* — Joshua Huson
(74) *Attorney, Agent, or Firm* — Patents+TMS, P.C.

(57) ABSTRACT

An apparatus, a system and a method have a speed-limiting braking mechanism. The apparatus may use a leash to limit a velocity of movement of a pet relative to a velocity of movement of a user of the apparatus. The speed-limiting braking mechanism within the apparatus may prevent the relative velocity from exceeding a predetermined threshold without abruptly stopping unwinding of the leash. The speed-limiting braking mechanism may have a rotatable pinion component connected to one or more brake shoes. The leash may be connected to a spool. Unwinding of the leash may rotate the spool, and rotation of the spool may rotate the pinion component. If the relative velocity exceeds the predetermined threshold, the one or more brake shoes may engage a braking liner to maintain the relative velocity at the predetermined threshold.

11 Claims, 4 Drawing Sheets

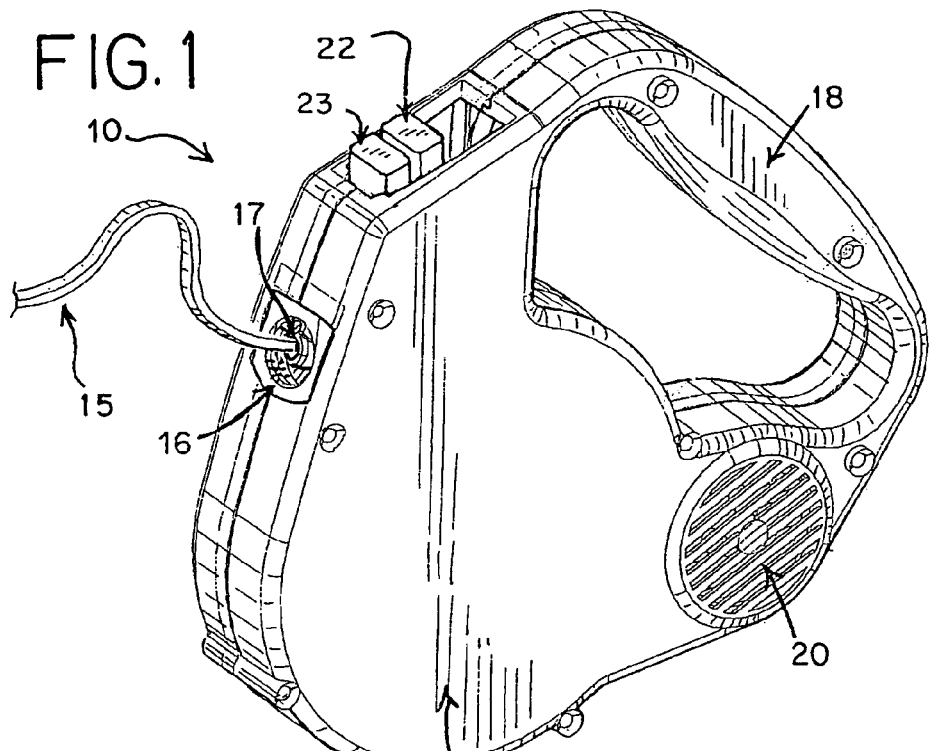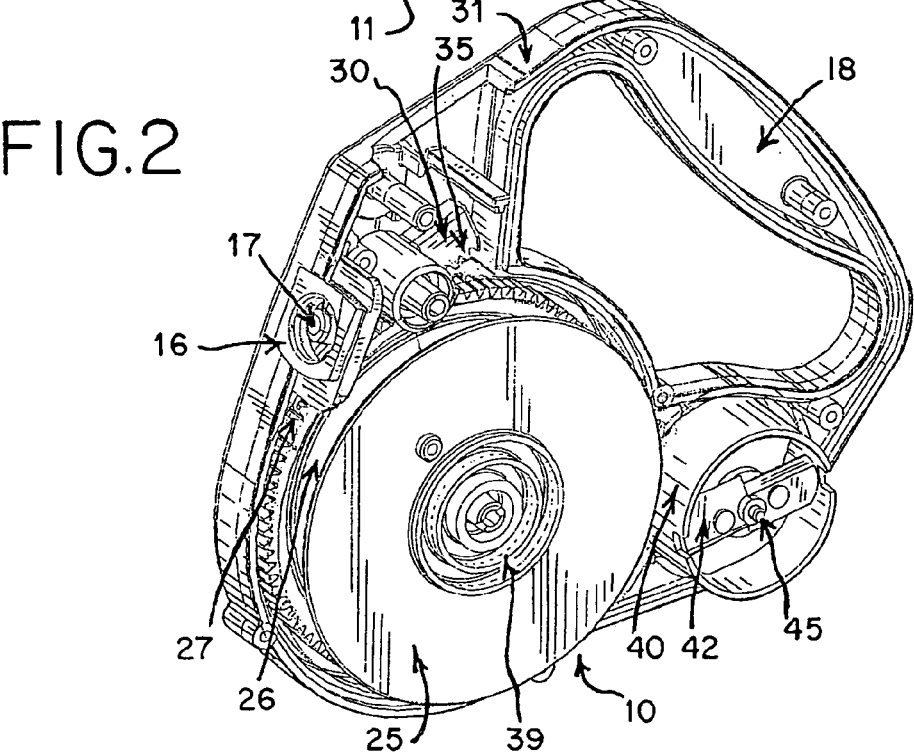

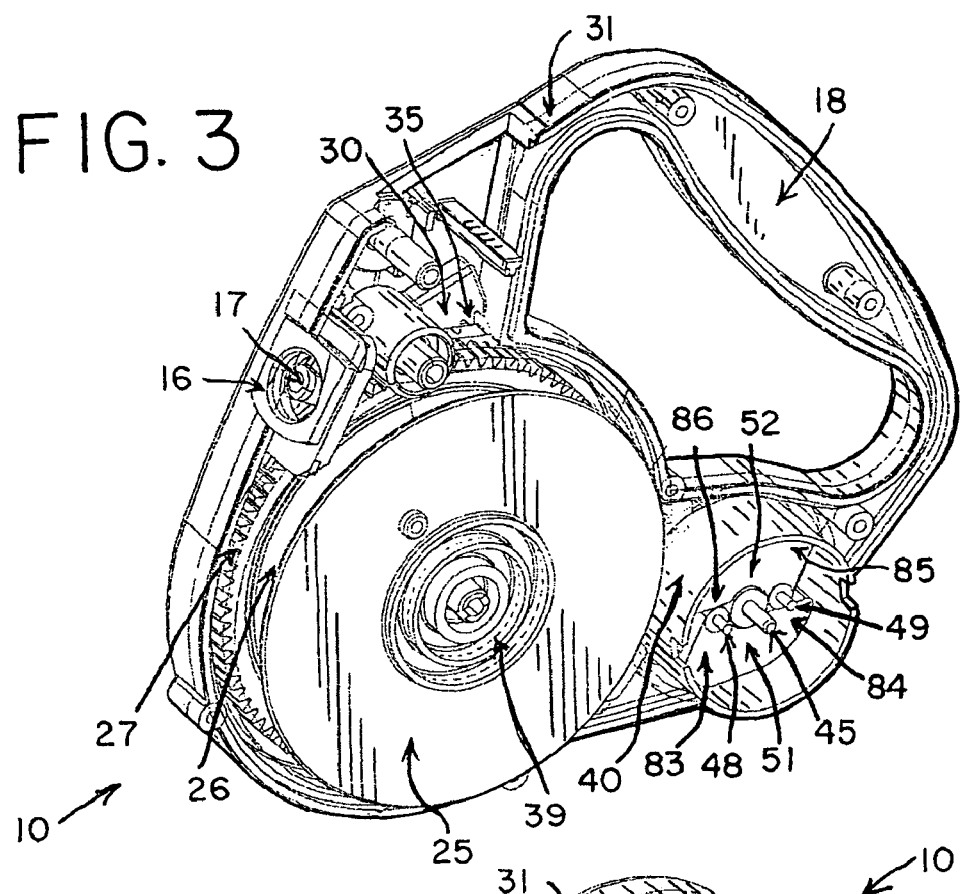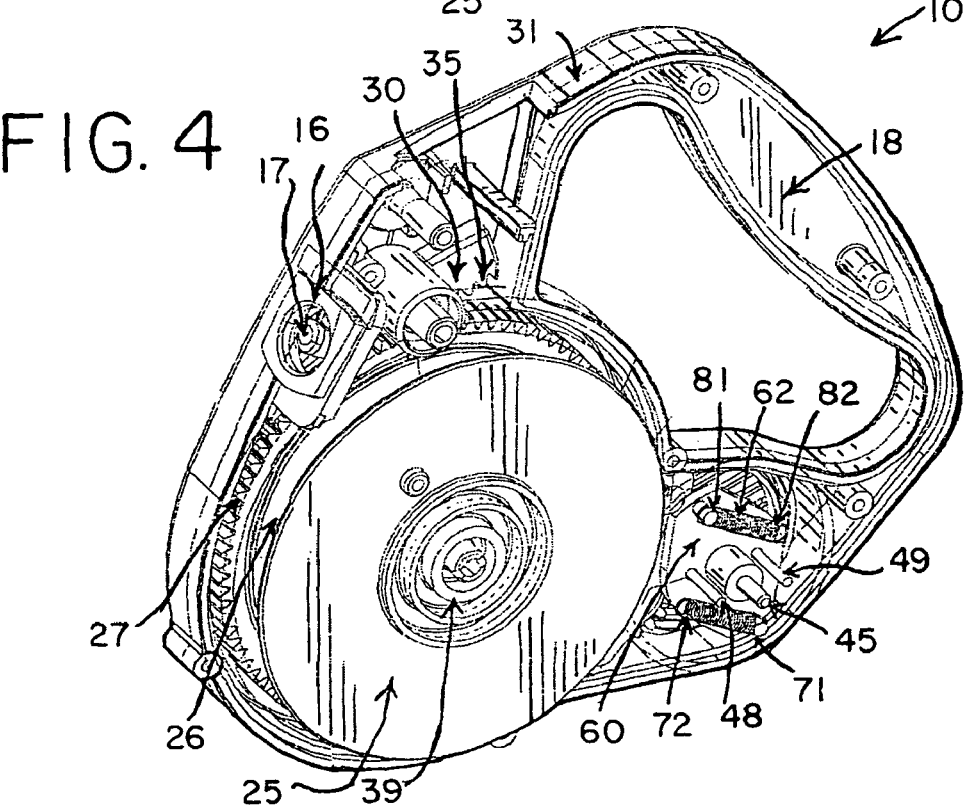

LEASH HAVING A SPEED-LIMITING BRAKING MECHANISM AND SYSTEM AND METHOD FOR USING SAME

BACKGROUND OF THE INVENTION

The present invention generally relates to a leash having a speed-limiting braking mechanism and a system and a method for using the same. More specifically, the present invention relates to an apparatus which may use a leash to limit a velocity of movement of a pet relative to a velocity of movement of a user of the apparatus. The speed-limiting braking mechanism may prevent the relative velocity from exceeding a predetermined threshold without abruptly stopping unwinding of the leash. For example, if the user has a walking pace, the apparatus may enable the pet to move at a speed greater than or equal to the walking pace of the user but less than the predetermined threshold; and, if the user has a running pace, the apparatus may enable the pet to move at a speed greater than or equal to the running pace of the user but less than the predetermined threshold.

Known leashes for dogs and other pets typically have a hand-held housing containing a spool rotatably mounted in the housing. The leash has an end which may be attached to a collar worn by the pet and an opposite end which extends through an opening in the housing to connect to the spool; A spring may bias the spool to rotate in a first direction that winds the leash onto the spool. If the pet pulls the leash thereby rotating the spool in a second direction to unwind the leash, tension is applied to the spring. The amount of tension on the spring corresponds to a distance from the spool to the pet. If the distance from the spool to the pet decreases, the tension on the spring is released thereby rotating the spool in the first direction to wind the cord onto the spool.

However, the running speed of the pet may increase above a desired velocity. The increased running speed of the pet may enable the pet to run to a location which the user does not wish the pet to attain, such as, for example, a roadway or a location adjacent to another pet or another person. Also, the user may react to the increased running speed of the pet by grabbing the leash with a bare hand, which may discomfort or may injure the hand of the user.

In addition, if the leash completely unwinds or the user activates a button to prevent continued rotation of the spool, the leash may be prevented from further unwinding. Also, if the user activates the button to prevent continued rotation of the spool, the leash may be prevented from winding and/or retracting. If the pet stops pulling the leash when the leash is prevented from winding and/or retracting, the leash may drag on the ground, which may enable the pet to be temporarily unrestrained and may damage and/or may sever the leash. If the pet is running when the leash is prevented from further unwinding, the leash may pull the pet in a direction opposite to the direction the pet is running. For example, the running of the pet may be abruptly stopped.

The abrupt stop may be jarring for both the pet and the user. For example, the abrupt stop may suddenly pull the user forward by applying force to the back, the shoulders and the arms of the user. The force may pull the housing from the hand of the user and may cause discomfort and/or injury to the user. Further, the abrupt stop may cause the leash to quickly pull the body and/or the head of the pet in a direction opposite to the direction the pet is running. Accordingly, the pet may be discomforted and/or injured by abruptly stopping. For example, if the leash is attached to the neck of the pet, the abrupt stop may cause a neck injury to the pet. Moreover, the abrupt stop may apply increased tension to the leash which may damage and/or may sever the leash. A severed leash may enable the pet to run from the user unrestrained.

SUMMARY OF THE INVENTION

The present invention generally relates to a leash having a speed-limiting braking mechanism and a system and a method for using the same. More specifically, the present invention relates to an apparatus which may use a leash to limit a velocity of movement of a pet relative to a velocity of movement of a user of the apparatus. The speed-limiting braking mechanism within the apparatus may prevent the relative velocity from exceeding a predetermined threshold without abruptly stopping unwinding of the leash. For example, if the user has a walking pace, the apparatus may enable the pet to move at a speed greater than or equal to the walking pace of the user but less than the predetermined threshold; and, if the user has a running pace, the apparatus may enable the pet to move at a speed greater than or equal to the running pace of the user but less than the predetermined threshold.

The speed-limiting braking mechanism may have a rotatable pinion component connected to one or more brake shoes. The leash may be connected to a spool. Unwinding of the leash may rotate the spool, and rotation of the spool may rotate the pinion component. If the relative velocity exceeds the predetermined threshold, the one or more brake shoes may engage a braking liner to maintain the relative velocity at the predetermined threshold. If the pet stops pulling the leash, the relative velocity may decrease below the predetermined threshold, and the one or more brake shoes may disengage from the braking liner.

To this end, in an embodiment of the present invention, an apparatus is provided. The apparatus has a housing having an interior, an exterior and an opening located between the exterior and the interior; a spool in the interior of the housing wherein the spool rotates relative to the housing; a leash that extends through the opening in the housing wherein a first end of the leash is connected to the spool and further wherein the second end of the leash is in the exterior of the housing; a pinion component in the interior of the housing wherein the pinion component is connected to the spool and further wherein the pinion component rotates relative to the housing in response to rotation of the spool; a brake shoe in the interior of the housing wherein the pinion component is connected to the brake shoe; and a braking liner in the interior of the housing wherein the brake shoe is adjacent to the braking liner.

In an embodiment, the apparatus has a swing gear which connects the pinion component to the spool.

In an embodiment, the apparatus has a shaft which extends through the brake shoe and the pinion component to connect the brake shoe to the pinion component.

In an embodiment, the apparatus has a fan blade in the interior of the housing wherein the fan blade is rotatably connected to the housing by a fan shaft which extends through the pinion component.

In an embodiment, the apparatus has teeth which extend outward from the spool wherein rotation of the spool rotates the teeth.

In an embodiment, the apparatus has teeth connected to a first side of the pinion component wherein the brake shoe is connected to a second side of the pinion component and further wherein the second side is located in a position opposite to the first side.

In an embodiment, the apparatus has a handle connected to the housing.

In an embodiment, the apparatus has a spring having a first end connected to the brake shoe and a second end connected to the pinion component.

In an embodiment, the braking liner has a cylindrical shape.

In another embodiment of the present invention, a method for restraining a pet using a leash. The method has the steps of attaching the leash to the pet; unwinding the leash from a spool to which the leash is connected wherein the spool is located within a housing; and generating resistance to unwinding of the leash if a rate of rotation of the spool exceeds a threshold wherein the resistance is generated by a braking mechanism connected to the spool and further wherein the braking mechanism automatically generates the resistance if the rate of rotation of the spool exceeds the threshold.

In an embodiment, the method has the step of contacting a brake shoe with a braking liner wherein the braking liner is located within the housing and further wherein contact between the brake shoe and the braking liner generates the resistance wherein the brake shoe contacts the braking liner if the rate of rotation of the spool exceeds the threshold and further wherein the brake shoe does not contact the braking liner if the rate of rotation of the spool does not exceed the threshold.

In an embodiment, the method has the step of rotating a pinion component connected to a brake shoe wherein the pinion component and the brake shoe are located within the housing and further wherein rotation of the brake shoe generates the resistance wherein rotation of the spool rotates the pinion component.

In an embodiment, the method has the step of rotating a pinion component connected to the spool by a swing gear wherein the swing gear is located inside of the housing and further wherein rotation of the spool rotates the swing gear wherein rotation of the swing gear rotates the pinion component.

In an embodiment, the method has the step of unwinding an additional amount of the leash from the spool during generation of the resistance by the braking mechanism.

In an embodiment, the method has the step of ceasing generation of the resistance if the rate of rotation of the spool decreases below the threshold wherein the braking mechanism ceases the generation of the resistance.

In an embodiment, the method has the step of rotating a fan blade connected to the braking mechanism wherein the fan blade rotates in response to rotation of the spool.

In another embodiment of the present invention, a system for unwinding a leash is provided. The system has a housing which has an interior and an exterior; a spool in the interior of the housing wherein the spool has teeth and further wherein the spool rotates relative to the housing wherein the leash is connected to the spool; a swing gear in the interior of the housing wherein the swing gear has teeth which engage the teeth of the spool to rotate the swing gear in response to rotation of the spool; and a braking mechanism in the interior of the housing wherein the braking mechanism has teeth which engage the teeth of the swing gear to rotate the braking mechanism in response to rotation of the swing gear.

In an embodiment, the system has a brake shoe in the interior of the housing wherein the brake shoe is located adjacent to a braking liner and further wherein the brake shoe engages the braking liner if a rate of rotation of the spool exceeds a threshold.

In an embodiment, the system has a pinion component which rotates in response to the rotation of the swing gear wherein the teeth of the braking mechanism are connected to the pinion component.

In an embodiment, the system has a locking arm in the interior of the housing wherein the locking arm has teeth which engage the teeth of the spool if the locking arm is moved toward the spool.

It is, therefore, an advantage of the present invention to provide a leash having a speed-limiting braking mechanism and a system and a method for using the same.

Another advantage of the present invention is to provide a leash having a speed-limiting braking mechanism and a system and a method for using the same which may provide resistance to unwinding of a retractable leash from a spool.

A further advantage of the present invention is to provide a leash having a speed-limiting braking mechanism and a system and a method for using the same which may limit a running speed of the pet.

Yet another advantage of the present invention is to provide a leash having a speed-limiting braking mechanism and a system and a method for using the same which may limit a distance of the pet from the user without using an abrupt stop.

Another advantage of the present invention is to provide a leash having a speed-limiting braking mechanism and a system and a method for using the same which may reduce and/or may prevent force applied to the user and the pet due to an abrupt stop.

A further advantage of the present invention is to provide a leash having a speed-limiting braking mechanism and a system and a method for using the same which may enable the user to use the leash with one hand.

Yet another advantage of the present invention is to provide a leash having a speed-limiting braking mechanism and a system and a method for using the same which may generate minimal resistance against rotation of a spool during slow rotation of the spool and may generate increased resistance against the rotation of the spool during faster rotation of the spool.

Another advantage of the present invention is to provide a leash having a speed-limiting braking mechanism and a system and a method for using the same which may maintain a speed of movement of the pet at a walking velocity of the user.

A further advantage of the present invention is to provide a leash having a speed-limiting braking mechanism and a system and a method for using the same which may use a braking mechanism which maintains engagement if tension is applied to the leash and disengages if the tension is released.

Yet another advantage of the present invention is to provide a leash having a speed-limiting braking mechanism and a system and a method for using the same which may enable a user to establish a maximum length to which the leash unwinds.

Another advantage of the present invention is to provide a leash having a speed-limiting braking mechanism and a system and a method for using the same which may implement both the speed-limiting braking mechanism and a user-controlled braking mechanism which is a different mechanism than the speed-limiting braking mechanism.

A further advantage of the present invention is to provide a leash having a speed-limiting braking mechanism and a system and a method for using the same which may automatically activate the speed-limiting braking mechanism without user action.

Yet another advantage of the present invention is to provide a leash having a speed-limiting braking mechanism and a system and a method for using the same which may enable a user to establish a maximum length to which the leash unwinds.

Another advantage of the present invention is to provide a leash having a speed-limiting braking mechanism and a system and a method for using the same which may prevent and/or may reduce discomfort and/or injury to a pet.

A further advantage of the present invention is to provide a leash having a speed-limiting braking mechanism and a system and a method for using the same which may prevent and/or may reduce discomfort and/or injury to a user.

Yet another advantage of the present invention is to provide a leash having a speed-limiting braking mechanism and a system and a method for using the same which may behaviorally condition a pet by implementing a maximum running speed of the pet.

Moreover, another advantage of the present invention is to provide a leash having a speed-limiting braking mechanism and a system and a method for using the same which may enable a pet to be restrained as desired by the user.

Additional features and advantages of the present invention are described in, and will be apparent from, the detailed description of the presently preferred embodiments and from the drawings.

BRIEF DESCRIPTION OF THE DRAWINGS

FIG. 1 illustrates a side perspective view of an apparatus in an embodiment of the present invention.

FIG. 2 illustrates a side perspective view of the apparatus with the second piece of the housing removed in an embodiment of the present invention.

FIG. 3 illustrates a side perspective view of the apparatus with the second piece of the housing and the fan blade removed in an embodiment of the present invention.

FIG. 4 illustrates a side perspective view of the apparatus with the second piece of the housing, the fan blade, the braking liner, the first brake shoe and the second brake shoe removed in an embodiment of the present invention.

DETAILED DESCRIPTION OF THE PRESENTLY PREFERRED EMBODIMENTS

Figure 5:
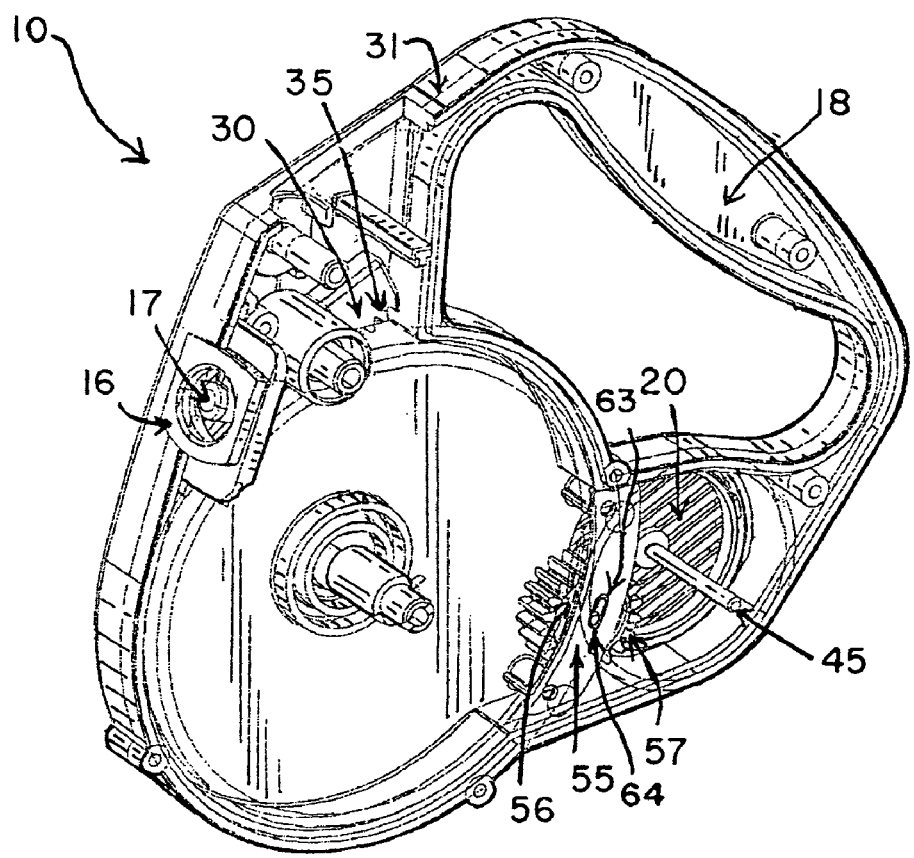
FIG. 5 illustrates a side perspective view of the apparatus with the second piece of the housing, the fan blade, the first brake shoe, the second brake shoe and the pinion component removed in an embodiment of the present invention.

The present invention generally relates to a leash having a speed-limiting braking mechanism and a system and a method for using the same. More specifically, the present invention relates to an apparatus which may use a leash to limit a velocity of movement of a pet relative to a velocity of movement of a user of the apparatus. The speed-limiting braking mechanism within the apparatus may prevent the relative velocity from exceeding a predetermined threshold without abruptly stopping unwinding of the leash. For example, if the user has a walking pace, the apparatus may enable the pet to move at a speed greater than or equal to the walking pace of the user but less than the predetermined threshold; and, if the user has a running pace, the apparatus may enable the pet to move at a speed greater than or equal to the running pace of the user but less than the predetermined threshold.

The speed-limiting braking mechanism may have a rotatable pinion component connected to one or more brake shoes. The leash may be connected to a spool. Unwinding of the leash may rotate the spool, and rotation of the spool may rotate the pinion component. If the relative velocity exceeds the predetermined threshold, the one or more brake shoes may engage a braking liner to maintain the relative velocity at the predetermined threshold. If the pet stops pulling the leash, the relative velocity may decrease below the predetermined threshold, and the one or more brake shoes may disengage from the braking liner.

A fan blade may be connected to the pinion component. Rotation of the fan blade may dissipate heat generated by engagement of the one or more brake shoes with the braking liner, and rotation of the pinion component in response to rotation of the spool may rotate the fan blade.

Referring now to the drawings wherein like numerals refer to like parts, FIG. 1 generally illustrates an apparatus 10 having a housing 11 from which a leash 15 may extend in an embodiment of the present invention. The housing 11 may have a leash guide 16 that may provide an opening 17. The leash 15 may extend from an interior of the housing 11 through the opening. The leash 15 may have any shape, such as, for example, the shape of a flat strip. In an embodiment, the leash 15 may be a webbing of fabric woven into a flat strip as known to one having ordinary skill in the art. The leash 15 may have any length, and the present invention is not limited to a specific length of the leash 15.

The apparatus 10 may have a handle 18 which may enable a user of the apparatus 10 to hold the apparatus 10 using one hand or both hands. The apparatus 10 may have a first locking button 22 and/or a second locking button 23 which may be located adjacent to the handle 18. The user may activate the first locking button 22 and/or the second locking button 23, such as, for example, by depressing the first locking button 22 and/or the second locking button 23, respectively. Activation of the first locking button 22 and/or the second locking button 23 may maintain a current length of the leash 15 provided by the apparatus 10 and/or may prevent the apparatus 10 from providing an additional length of the leash 15.

In an embodiment, the first locking button 22 may maintain the current length of the leash 15 if the first locking button 22 is activated. For example, the apparatus 10 may maintain the current length of the leash 15 if the user holds the first locking button 22 in a depressed position. After the user releases the first locking button 22 from the depressed position, the apparatus 10 may then provide an additional length of the leash 15 if the leash 15 is pulled.

In an embodiment, the second locking button 23 may maintain the current length of the leash 15 until the second locking button 23 is activated a second time. For example, if the user pushes the second locking button 23 at a first time, the apparatus 10 may maintain the current length of the leash 15 until the user pushes the second locking button 22 at a second time. Accordingly, the second locking button 22 may be used to maintain the current length of the leash 15 without requiring the user to continuously hold a button in a depressed position.

In an embodiment, the apparatus 10 and/or the housing 11 may have vents 20 which may enable air and/or heat to be displaced from the interior of the housing 11 as discussed in more detail hereafter. The housing 11 may be manufactured from any material, such as, for example, a plastic.

As generally illustrated in FIG. 2, the housing 11 may be formed by a first piece 31 and/or a second piece 32. The first piece 31 of the housing 11 may connect to the second piece 32 of the housing 11 using screws, bolts, adhesives, male-female connections and/or any connection known to one having ordinary skill in the art. The present invention is not limited to a specific connection between the first piece 31 of the housing 11 and the second piece 32 of the housing 11.

A spool 25 may be rotatably connected to the housing 11. For example, the spool 25 may be rotatably connected to the first piece 31 and/or the second piece 32 of the housing 11. A first end of the leash 15 may be connected to the spool 25, and/or a second end of the leash 15 may extend through the opening 17. In an embodiment, the second end of the leash 15 may connect to a collar of a pet.

The spool 25 may have a groove 26, such as, for example, an indentation, a channel, a depression and/or the like which may extend into the spool 25. The leash 15 may be wound around the spool 25 and/or may be located in the groove 26 of the spool 25. The spool 25 may rotate to enable the apparatus 10 to provide an additional length of the leash 15. For example, the spool 25 may rotate to enable the additional length of the leash 15 to travel from the interior of the housing 11 through the opening 17. The spool 25 may have spool teeth 27 which may be adjacent to the groove 26. In an embodiment, the spool 25 may have a perimeter, and the groove 26 and/or the spool teeth 27 may be located along the perimeter of the spool 25 in its entirety.

A distance between the user and the pet may be based on a velocity at which the pet moves relative to a velocity at which the user moves (hereinafter "the relative velocity"). If the relative velocity increases, the distance between the user and the pet may increase. For example, the user may be stationary, and the pet may move away from the user. As another example, the user may be moving at a walking pace, and the pet may run at a velocity which exceeds the walking pace. If the relative velocity decreases, the distance between the user and the pet may decrease. For example, the user may move toward the pet, and the pet may be stationary. As another example, the pet may move at a walking pace, and the user may run at a velocity which exceeds the walking pace. If the relative velocity stays constant, the distance between the user and the pet may stay constant. For example, both the user and the pet may be stationary. As another example, the velocity at which the pet moves may be equal to the velocity at which the user moves. The present invention is not limited to a specific velocity at which the pet moves, a specific velocity at which the user moves or a specific relative velocity. The present invention may be used for any velocity at which the pet moves, any velocity at which the user moves and any relative velocity.

If the relative velocity increases, the pet may pull the second end of the leash 15. Pulling the second end of the leash 15 may pull an additional length of the leash 15 from the apparatus 10 and/or may increase a current length of the leash 15. Accordingly, increasing the relative velocity may rotate the spool 25 because the first end of the leash 15 may be connected to the spool 25.

A locking arm 30 may be rotatably connected to the housing 11. For example, the locking arm 30 may be rotatably connected to the first piece 31 and/or the second piece 32 of the housing 11. Activation of the first locking button 22 and/or the second locking button 23 may rotate the locking arm 30 in a direction toward the spool 25. The locking arm 30 may have locking teeth 35, and/or rotation of the locking arm 30 in the direction toward the spool 25 may engage the locking teeth 35 with the spool teeth 27. Engagement of the locking teeth 35 with the spool teeth 27 may prevent rotation of the spool 25. Preventing the rotation of the spool 25 may maintain the current length of the leash 15 provided by the apparatus 10 and/or may prevent the apparatus from providing an additional length of the leash 15. Accordingly, the activation of the first locking button 22 and/or the second locking button 23 may prevent the pet from increasing the relative velocity, and/or the pet may maintain or decrease the relative velocity if the first locking button 22 and/or the second locking button 23 are activated.

A spring cover 39 may be connected to the spool 25. The spring cover 39 may contain a spring (not shown) which may bias the spool 25 in one direction, such as, for example, clockwise or counter-clockwise. Accordingly, in the absence of tension on the leash 15, the spool 25 may rotate to wind the leash 15 around the spool 25 and/or into the groove 26. For example, if the relative velocity decreases, tension may decrease and/or may be removed from the leash 15. Then, the spool 25 may rotate to wind the leash 15 around the spool 25 and/or into the groove 26. For example, the spool 25 may rotate to wind the leash 15 around the spool 25 if the pet moves toward the user. As another example, the spool 25 may rotate to wind the leash 15 around the spool 25 if the user moves toward the pet and the velocity of movement of the user exceeds the velocity of movement of the pet.

The apparatus 10 may have a braking liner 40 rigidly connected to the housing 11. The braking liner 40 may be rigidly connected to the housing 11 such that the braking liner 40 may not move relative to the housing 11. For example, the braking liner 40 may be rigidly connected to the first piece 31 and/or the second piece 32 of the housing 11. The braking liner 40 may be manufactured from any material. In an embodiment, the braking liner 40 may be manufactured from stainless steel. The braking liner 40 may extend from the first piece 31 of the housing 11 to the second piece 32 of the housing 11. In an embodiment, the braking liner 40 may extend from the vents 20 of the first piece 31 of the housing 11 to the vents 20 of the second piece 32 of the housing 11.

The apparatus 10 may have a fan shaft 45 which may extend from the first piece 31 of the housing 11 to the second piece 32 of the housing 11. The braking liner 40 may have any shape. In an embodiment, the braking liner 40 may have a cylindrical shape and/or may have an axis. The fan shaft 45 may be located at the axis of the cylinder. A fan blade 42 may be rotatably connected to the fan shaft 45. The fan blade 42 may rotate to displace air and/or heat from the interior of the housing 10 through the vents 20.

Figure 6:
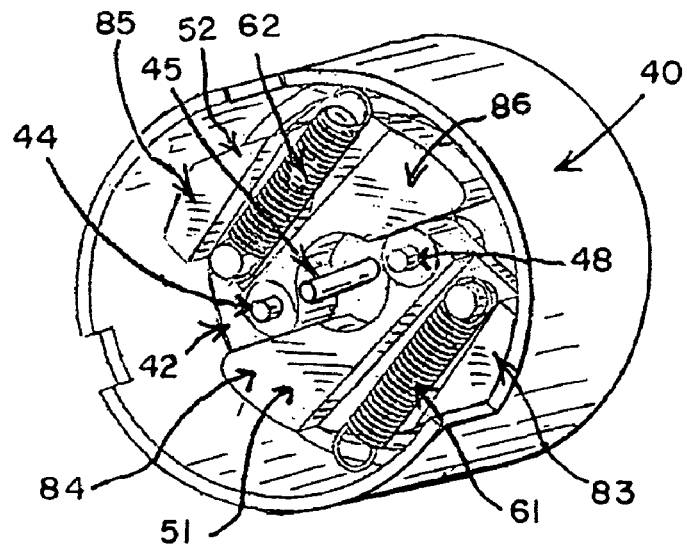
FIG. 6 illustrates a side view of the braking liner, the fan shaft, the fan blade, the first brake shoe, the second brake shoe, the first spring and the second spring with the pinion component removed in an embodiment of the present invention, and the view is from an opposite side relative to FIGS. 1-5.

As generally illustrated in FIG. 3, the fan blade 42 may have an opening 43 through which the fan shaft 45 may extend. A pinion component 60 may be located adjacent to the braking liner 40, and/or a first brake shaft 48 and/or a second brake shaft 49 may be connected to the pinion component 60. The first brake shaft 48 may be located on an opposite side of the fan shaft 45 relative to the second brake shaft 49. The first brake shaft 48 may extend through a first brake shoe 51, and/or the second brake shaft 49 may extend through a second brake shoe 52. As generally illustrated in FIGS. 3 and 6, the first brake shoe 51 may have a first end 83 and a second end 84, and/or the first brake shaft 48 may be located between the first end 83 and the second end 84 of the first brake shoe 51. The second brake shoe 52 may have a first end 85 and a second end 86, and/or the second brake shaft 49 may be located between the first end 85 and the second end 86 of the second brake shoe 52.

Referring again to FIG. 3, the fan blade 42 may have a first cavity 58 which may receive the first brake shaft 48, and/or the fan blade 42 may have a second cavity 59 which may receive the second brake shaft 49. If the spool 25 and/or the pinion component 60 rotate, the first brake shaft 48 and/or the second brake shaft 49 may rotate relative to the fan shaft 45 as described in more detail hereafter. Rotation of the first brake shaft 48 and/or the second brake shaft 49 may rotate the fan blade 42 to displace air and/or heat from the interior of the housing 10 through the vents 20. In an embodiment, an exterior of the braking liner 40 may be painted black to assist in heat transfer. In an embodiment, cooling vanes (not shown) may be connected to the braking liner 40 to assist in heat transfer.

As generally illustrated in FIG. 4, the first brake shaft 48 and/or the second first brake shaft 49 may connect the first brake shoe 51 and/or the second brake shoe 52, respectively, to the pinion component 60. Rotation of the spool 25 may rotate the pinion component 60 as described in more detail hereafter. For example, if the distance between the user and the pet increases, unwinding of the leash 15 may rotate the spool 25. Rotation of the pinion component 60 may rotate the first brake shaft 48 and/or the second first brake shaft 49 around the fan shaft 45. As described previously, rotation of the first brake shaft 48 and/or the second brake shaft 49 around the fan shaft 45 may rotate the fan blade 42.

A first spring 61 and/or a second spring 62 may be connected to the pinion component 60. The first spring 61 and/or the second spring 62 may be connected to the first brake shoe 51 and/or the second brake shoe 52, respectively. For example, a first end 71 of the first spring 61 may be connected to the pinion component 60, and/or a second end 72 of the first spring 61 may be connected to the first brake shoe 51. A first end 81 of the second spring 62 may be connected to the pinion component 60, and/or a second end 82 of the second spring 62 may be connected to the second brake shoe 52. In an embodiment, the second end 72 of the first spring 61 may be connected to the first end 83 of the first brake shoe 51, and/or the second end 72 of the second spring 62 may be connected to the first end 85 of the second brake shoe 52.

As generally illustrated in FIG. 5, the fan shaft 45 may be connected to the housing 11. The fan shaft 45 may be rigidly connected to the housing 11 such that the fan shaft 45 may not move relative to the housing 11. For example, the fan shaft 45 may be rigidly connected to the first piece 31 and/or the second piece 32 of the housing 11. In an embodiment, the fan shaft 45 may be directly connected to the first piece 31 and/or the second piece 32 of the housing 11. In another embodiment, the fan shaft 45 may be connected to a first metal plate and/or a second metal plate (not shown) connected to the first piece 31 and/or the second piece 32 of the housing 11, respectively. The present invention is not limited to a specific embodiment of the connection of the fan shaft 45 to the housing 11.

A swing gear bracket 55 may be connected to the housing 11, such as, for example, the first piece 31 and/or the second piece 32 of the housing 11. The apparatus 10 may have a swing gear 56 which may have swing gear teeth 57. The swing gear 56 may be rotatably connected to the swing gear bracket 55. The spool 25, the swing gear 56 and the pinion component 60 may be manufactured from any material. In an embodiment, the spool 25, the swing gear 56 and the pinion component 60 may be a plastic, such as, for example, acetal resin.

The swing gear bracket 55 may have a slot 63. The swing gear 56 may be connected to the swing gear bracket 55 using the slot 63. For example, a pin 64 may extend through the swing gear 56 and/or into the slot 63 to connect the swing gear 56 to the swing gear bracket 55. The swing gear 56 may move in an upward direction and/or a downward direction relative to the apparatus 10. For example, the pin 64 may move in an upward direction and/or a downward direction relative to the slot 63 which may move the swing gear 56 in the upward and/or the downward direction relative to the apparatus 10, respectively.

Figure 7:
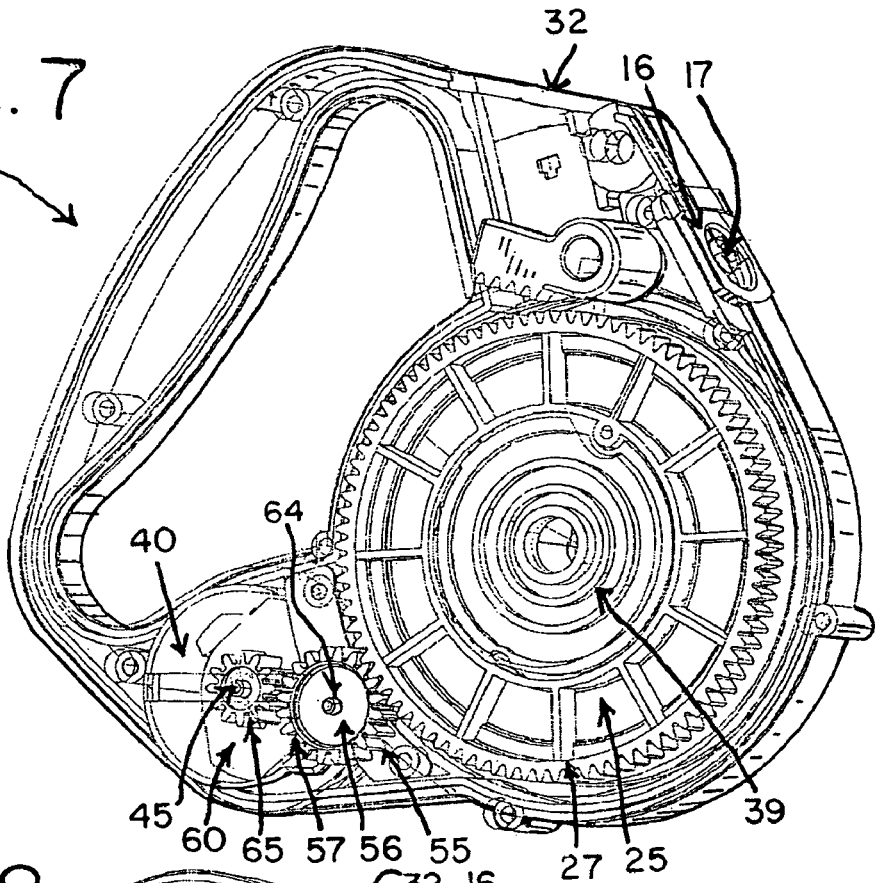
FIG. 7 illustrates a side perspective view of the apparatus with the first piece of the housing removed in an embodiment of the present invention, and the view is from an opposite side relative to FIGS. 1-5.

As generally illustrated in FIG. 7, the pinion component 60 may have pinion teeth 65. The pinion teeth 65 may engage the swing gear teeth 57. In an embodiment, the pinion teeth 65 may be located on an opposite side of the pinion component 60 relative to the first brake shoe 51, the second brake shoe 52 and/or the fan blade 42.

The swing gear teeth 57 may engage the spool teeth 27. Unwinding of the leash 15 may move the swing gear 56 in the upward direction relative to the apparatus 10 because the spool teeth 27 engage the swing gear teeth 57. For example, rotation of the spool 25 may move the swing gear 56 in the upward direction relative to the apparatus 10. If the leash 15 is not unwinding, the swing gear 57 may be located in a first position, such as, for example, at the bottom of the slot 63. If the swing gear 56 is located at the first position, the swing gear teeth 57 do not engage the pinion teeth 65. Rotation of the spool 25 may rotate the spool teeth 27 which may move the swing gear 56 in an upward direction from the first position to a second position. Moving the swing gear 56 to the second position may engage the swing gear teeth 57 with the pinion teeth 65. Accordingly, unwinding the leash 15 may engage the swing gear teeth 57 with the pinion teeth 65.

Rotation of the spool 25 may rotate the swing gear 56 if the spool 25 rotates because of engagement of the swing gear teeth 57 with the spool teeth 27. For example, if the relative velocity and/or the distance between the user and the pet increase, unwinding of the leash 15 may rotate the spool 25 because the first end of the leash 15 may be connected to the spool 25. Accordingly, unwinding of the leash 15 may rotate the swing gear 56 because the spool teeth 27 may engage the swing gear teeth 57.

Rotation of the swing gear 56 may rotate the pinion component 60 because of engagement of the swing gear teeth 57 with the pinion teeth 65. Rotation of the pinion component 60 may rotate the first brake shoe 51 and/or the second brake shoe 52 because the first brake shaft 48 and/or the second brake shaft 49 may connect the pinion component 60 to the first brake shoe 51 and/or the second brake shoe 52, respectively. Accordingly, unwinding of the leash 15 may rotate the first brake shoe 51 and/or the second brake shoe 52. For example, unwinding of the leash 15 may rotate the pinion component 60 which may rotate the first brake shoe 51 and/or the second brake shoe 52.

Therefore, if the relative velocity and/or the distance between the user and the pet increase, rotation of the pinion component 60 may rotate the first brake shoe 51 and/or the second brake shoe 52. If the relative velocity and/or the distance between the user and the pet exceed a predetermined threshold, the first brake shoe 51 and/or the second brake shoe 52 may engage the braking liner 40. For example, rotation of the first brake shoe 51 and/or the second brake shoe 52 may engage the first brake shoe 51 and/or the second brake shoe 52 with the braking liner 40. The rotation of the first brake shoe 51 and/or the second brake shoe 52 may generate centrifugal force which may rotate the first brake shoe 51 and/or the second brake shoe 52 outward, respectively. For example, the rotation of the first brake shoe 51 and/or the second brake shoe 52 may rotate the first end 83 of the first brake shoe 51 and/or the first end 85 of the second brake shoe 52 outward, respectively. Accordingly, unwinding of the leash 15 may rotate the first end 83 of the first brake shoe 51 and/or the first end 85 of the second brake shoe 52 outward. For example, if the relative velocity and/or the distance between the user and the pet increase, the first end 83 of the first brake shoe 51 and/or the first end 85 of the second brake shoe 52 may rotate outward.

Rotating the first brake shoe 51 and/or the second brake shoe 52 outward may engage the first brake shoe 51 and/or the second brake shoe 52 with the braking liner 40, respectively. For example, the rotation of the first brake shoe 51 and/or the second brake shoe 52 may engage the first end 83 of the first brake shoe 51 and/or the first end 85 of the second brake shoe with the braking liner 40, respectively. Accordingly, rotation of the spool 25 due to unwinding of the leash 15 may engage the first brake shoe 51 and/or the second brake shoe 52 with the braking liner 40 because the swing gear 56 may connect the spool 25 to the pinion component 60. For example, if the relative velocity and/or the distance between the user and the pet increase, the first brake shoe 51 and/or the second brake shoe 52 may engage the braking liner 40.

Figure 8:
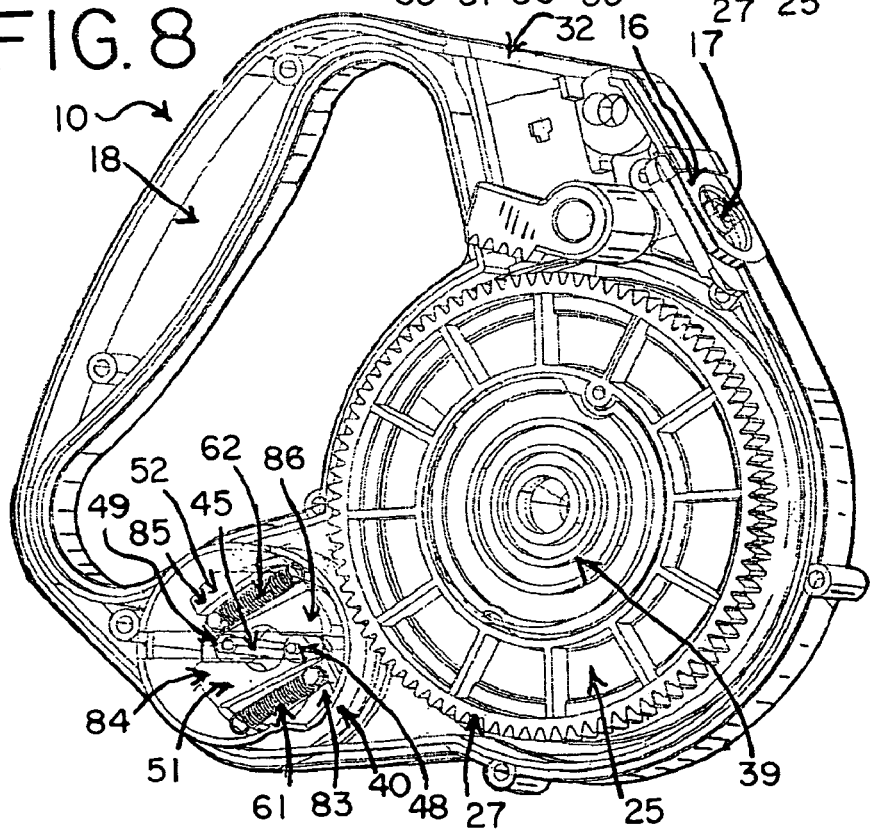
FIG. 8 illustrates a side perspective view of the apparatus with the first piece of the housing and the pinion component removed in an embodiment of the present invention, and the view is from an opposite side relative to FIGS. 1-5.

Unwinding of the leash 15 may increase a rate of rotation of the spool 25. For example, if the relative velocity and/or the distance between the user and the pet increase, the rate of rotation of the spool 25 may increase. An increase the rate of rotation of the spool 25 may engage the first brake shoe 51 and/or the second brake shoe 52 with the braking liner 40 as discussed previously. Centripetal force may be applied to the first brake shoe 51 and/or the second brake shoe 52 to control the rate of rotation of the spool 25 at which the first brake shoe 51 and/or the second brake shoe 52 engage the braking liner 40. As shown in FIG. 8, the first spring 61 and/or the second spring 62 may bias the first brake shoe 51 and/or the second brake shoe 52, respectively, away from the braking liner 40. The centripetal force may be based on a weight of the first brake shoe 51 and/or a weight of the second brake shoe 52.

Accordingly, the rate of rotation of the spool 25 at which the first brake shoe 51 and/or the second brake shoe 52 engage the braking liner 40 may be based on the weight of the first brake shoe 51, the weight of the second brake shoe 52, the force constant of the first spring 61 and/or the force constant of the second spring 62. For example, the rate of rotation of the spool 25 at which the first brake shoe 51 and/or the second brake shoe 52 engage the braking liner 40 may be based on the weight of the first end 83 of the first brake shoe 51 and/or the weight of the first end 85 of the second brake shoe 52, respectively. In addition, the rate of rotation of the spool 25 at which the first brake shoe 51 and/or the second brake shoe 52 engage the braking liner 40 may be based on gear ratios. For example, the rate of rotation of the spool 25 at which the first brake shoe 51 and/or the second brake shoe 52 engage the braking liner 40 may be based on a circumference of the spool 25, a circumference of the swing gear 56 and/or a circumference of a gear portion of the pinion component 60.

The weight of the first brake shoe 51, the weight of the second brake shoe 52, the force constant of the first spring 61 and/or the force constant of the second spring 62 may be selected by a manufacturer of the apparatus 10 to establish the rate of rotation of the spool 25 at which the first brake shoe 51 and/or the second brake shoe 52 engage the braking liner 40. For example, the manufacturer may select the weight of the first end 83 of the first brake shoe 51 and/or the weight of the first end 85 of the second brake shoe 52 to establish the rate of rotation of the spool 25 at which the first brake shoe 51 and/or the second brake shoe 52 engage the braking liner 40, respectively. In an embodiment, a component (not shown), such as, for example, a brass slot, may be added to the first end 83 of the first brake shoe 51 and/or the first end 85 of the second brake shoe 52 to adjust the weight. In addition, the circumference of the spool 25, the circumference of the swing gear 56 and/or the circumference of the gear portion of the pinion component 60 may be selected by the manufacturer of the apparatus 10 to establish the rate of rotation of the spool 25 at which the first brake shoe 51 and/or the second brake shoe 52 engage the braking liner 40.

If the relative velocity increases to exceed the predetermined threshold, unwinding of the leash 15 from the spool 25 may increase the rate of rotation of the spool 25. The rate of rotation of the spool 25 may increase to exceed the rate of rotation of the spool 25 at which the first brake shoe 51 and/or the second brake shoe 52 engage the braking liner 40. For example, if the velocity of movement of the pet increases and the velocity at which the user moves does not increase, the first brake shoe 51 and/or the second brake shoe 52 may engage the braking liner 40. As another example, if the velocity of movement of the pet stays constant and the velocity at which the user moves decreases, the first brake shoe 51 and/or the second brake shoe 52 may engage the braking liner 40. Engagement of the first brake shoe 51 and/or the second brake shoe 52 with the braking liner 40 may prevent the relative velocity from exceeding the predetermined threshold. For example, if the relative velocity and/or the distance between the user and the pet increase, the braking liner 40 may provide friction which may provide resistance to rotation of the first brake shoe 51 and/or the second brake shoe 52. Accordingly, if the relative velocity and/or the distance between the user and the pet increase, the apparatus 10 may prevent the relative velocity from exceeding the predetermined threshold as discussed in more detail hereafter.

Resistance against the rotation of the first brake shoe 51 and/or the second brake shoe 52 may generate resistance against rotation of the pinion component 60. For example, connection of the pinion component 60 to the first brake shoe 51 and/or the second brake shoe 52 may generate the resistance against the rotation of the pinion component 60 in response to the resistance against the rotation of the first brake shoe 51 and/or the second brake shoe 52, respectively. The resistance against the rotation of the pinion component 60 may generate resistance against rotation of the spool 25 because the swing gear 56 may connect the pinion component 60 to the spool 25. The resistance against rotation of the spool 25 may generate resistance against further unwinding of the leash 15 from the apparatus 10. Accordingly, the resistance against the further unwinding of the leash 15 may automatically prevent the relative velocity from exceeding the predetermined threshold without abruptly stopping the unwinding of the leash 15.

Then, the relative velocity and/or the distance between the user and the pet may decrease. If the relative velocity and/or the distance between the user and the pet decrease, the rate of rotation of the spool 25 may decrease. If the relative velocity decreases below the predetermined threshold, the rate of rotation of the spool 25 may decrease below the rate of rotation of the spool 25 at which the first brake shoe 51 and/or the second brake shoe 52 engage the braking liner 40. Then, the first brake shoe 51 and/or the second brake shoe 52 may disengage from the braking liner 40. Disengagement of the first brake shoe 51 and/or the second brake shoe 52 from the braking liner 40 may enable unwinding of the leash 15 from the spool 25 without resistance from the first brake shoe 51, the second brake shoe 52 and/or the braking liner 40.

Retraction of the leash 15 may move the swing gear 56 in the downward direction relative to the apparatus 10 because the spool teeth 27 engage the swing gear teeth 57. For example, rotation of the spool 25 may move the swing gear 56 in the downward direction relative to the apparatus 10. Rotation of the spool teeth 27 due to retraction of the leash 15 may move the swing gear 56 in a downward direction from the second position to the first position. Moving the swing gear 56 to the first position may disengage the swing gear teeth 57 from the pinion teeth 65. Accordingly, rotation of the spool 25 due to retraction of the leash 15 may disengage the swing gear teeth 57 from the pinion teeth 65.

The first brake shoe 51 and/or the second brake shoe 52 engaging the braking liner 40 may generate heat. For example, friction between the first brake shoe 51 and/or the second brake shoe 52 and the braking liner 40 may generate the heat. As discussed previously, rotation of the pinion component 60 may rotate the fan blade 42 because the fan blade 42 may be connected to the pinion component 60 by the first brake shaft 48 and/or the second brake shaft 49. Accordingly, the fan blade 42 may dissipate the heat through the vents 20. In an embodiment, the fan blade 42 may rotate continuously if the spool 25 rotates.

Therefore, the apparatus 10 may be used to restrain the pet without abruptly stopping the pet. The relative velocity and/or the distance between the user and the pet may increase, which may unwind the leash 15 from the spool 25. Unwinding the leash 15 may rotate the spool 25 because the first end of the leash 15 may be connected to the spool 25. Rotation of the spool 25 may rotate the swing gear 56 and/or may move the swing gear 56 into contact with the pinion component 60 because the spool teeth 27 may engage the swing gear teeth 57. Rotation of the swing gear 56 may rotate the pinion component 60 because the swing gear teeth 57 may engage the pinion teeth 65. Rotation of the pinion component 60 may rotate the first brake shoe 51 and/or the second brake shoe 52 because the first brake shaft 48 and/or the second brake shaft 49 may connect the pinion component 60 to the first brake shoe 51 and/or the second brake shoe 52, respectively. Rotation of the first brake shoe 51 and/or the second brake shoe 52 may engage the first brake shoe 51 and/or the second brake shoe 52 with the braking liner 40, respectively. For example, the rotation of the first brake shoe 51 and/or the second brake shoe 52 may engage the second end 84 of the first brake shoe 51 and/or the second end 86 of the second brake shoe 52 with the braking liner 40, respectively. Accordingly, if the relative velocity increases above the predetermined threshold, the first brake shoe 51 and/or the second brake shoe 52 may engage the braking liner 40.

Engagement of the first brake shoe 51 and/or the second brake shoe 52 with the braking liner 40 may generate resistance to rotation of the first brake shoe 51 and/or the second brake shoe 52. Resistance against the rotation of the first brake shoe 51 and/or the second brake shoe 52 may generate resistance against rotation of the pinion component 60. The resistance against the rotation of the pinion component 60 may generate resistance against rotation of the spool 25 because the swing gear 56 may connect the pinion component 60 to the spool 25. Accordingly, the engagement of the first brake shoe 51 and/or the second brake shoe 52 with the braking liner 40 may prevent the relative velocity from exceeding the predetermined threshold.

Then, the relative velocity and/or the distance between the user and the pet may decrease. If the relative velocity and/or the distance between the user and the pet decrease, the rate of rotation of the spool 25 may decrease. Retraction of the leash 15 may disengage the swing gear 56 from the pinion component 60. For example, the spool teeth 27 which engage the swing gear teeth 57 may rotate to remove the swing gear from contact from the pinion component 60. The rate of rotation of the spool 25 may decrease below the rate of rotation of the spool 25 at which the first brake shoe 51 and/or the second brake shoe 52 engage the braking liner 40. Then, the first brake shoe 51 and/or the second brake shoe 52 may disengage from the braking liner 40. Disengagement of the first brake shoe 51 and/or the second brake shoe 52 from the braking liner 40 may enable unwinding of the leash 15 from the spool 25 without resistance from the first brake shoe 51, the second brake shoe 52 and/or the braking liner 40.

The present invention is not limited to use as a restraint for a pet. In an embodiment, the apparatus 10 may be used as a restraint for a child. For example, the leash 15 may be attached to a harness worn by the child. In another embodiment, the apparatus 10 may be used as a lowering device. For example, the apparatus 10 may enable a user to descend from a building and/or another structure. In yet another embodiment, the apparatus 10 may be used as a sports training device. For example, an individual may use the apparatus 10 to exercise using resistance provided by the apparatus 10. The present invention is not limited to a specific use of the apparatus 10.

It should be understood that various changes and modifications to the presently preferred embodiments described herein will be apparent to those skilled in the art. Such changes and modifications may be made without departing from the spirit and scope of the present invention and without diminishing its attendant advantages.

I claim:

1. A system for controlling unwinding of a pet leash, the system comprising:
    a housing which has an interior and an exterior;
    a spool in the interior of the housing wherein the spool has teeth and further wherein the spool rotates relative to the housing wherein the leash is connected to the spool;
    a swing gear in the interior of the housing wherein the swing gear has teeth which engage the teeth of the spool to rotate the swing gear in response to rotation of the spool; and
    a braking mechanism in the interior of the housing wherein the braking mechanism has teeth which engage the teeth of the swing gear to rotate the braking mechanism in response to rotation of the swing gear and further wherein the swing gear translates within a slot from a first position in which the braking mechanism is not engaged to a second position in which the braking mechanism is engaged wherein the swing gear translates from the first position to the second position based on the rotation speed of the spool.

2. The system of claim 1 further comprising:
    a brake shoe in the interior of the housing wherein the brake shoe is located adjacent to a braking liner and further wherein the brake shoe engages the braking liner if the rotation speed of the spool exceeds a threshold.

3. The system of claim 1 further comprising:
    a pinion component which rotates in response to the rotation of the swing gear wherein the teeth of the braking mechanism are connected to the pinion component.

4. The system of claim 1 further comprising:
    a locking arm in the interior of the housing wherein the locking arm has teeth which engage the teeth of the spool if the locking arm is moved toward the spool.

5. The system of claim 1 further comprising:
    a brake shoe in the interior of the housing wherein the brake shoe is located adjacent to a braking liner and further wherein the brake shoe engages the braking liner if the rotation speed of the spool exceeds a threshold wherein the braking mechanism comprises the brake shoe and the braking liner;

a pinion component which rotates in response to the rotation of the swing gear wherein the teeth of the braking mechanism are connected to the pinion component; and a shaft which extends through the pinion component to connect the brake shoe to the pinion component.

6. The system of claim 1 further comprising:

a first brake shoe in the interior of the housing wherein the first brake shoe is located adjacent to a cylindrical braking liner and further wherein the first brake shoe engages the cylindrical braking liner if the rotation speed of the spool exceeds a threshold;

a second brake shoe in the interior of the housing at a position opposite to the first brake shoe wherein the second brake shoe is located adjacent to the cylindrical braking liner and further wherein the second brake shoe engages the cylindrical braking liner if the rotation speed of the spool exceeds a threshold wherein the braking mechanism comprises the first brake shoe, the second braking shoe and the braking liner;

a pinion component which rotates in response to the rotation of the swing gear wherein the teeth of the braking mechanism are connected to the pinion component;

a first shaft which extends through the pinion component to connect the first brake shoe to the pinion component; and a second shaft which extends through an opposite end of the pinion component relative to the first shaft wherein the second shaft connects the second brake shoe to the pinion component.

7. The system of claim 5 further comprising:

a spring having a first end connected to the brake shoe and a second end connected to the pinion component.

8. The system of claim 5 wherein the braking liner has a cylindrical shape.

9. The system of claim 1 further comprising:

a pinion component which rotates in response to the rotation of the swing gear wherein the teeth of the braking mechanism are connected to the pinion component; and a fan blade in the interior of the housing wherein the fan blade is rotatably connected to the housing by a fan shaft which extends through the pinion component.

10. The system of claim 1 further comprising:

a pinion component which rotates in response to the rotation of the swing gear wherein the teeth of the braking mechanism are connected to a first side of the pinion component and further wherein a brake shoe of the braking mechanism is connected to a second side of the pinion component wherein the second side is located in a position opposite to the first side.

11. The system of claim 1 further comprising:

a handle connected to the housing.

* * * * *